Aug. 22, 1961 R. LE RAY 2,996,949
THREE-DIMENSIONAL CINEMATOGRAPHY
Filed Dec. 14, 1953 4 Sheets-Sheet 1
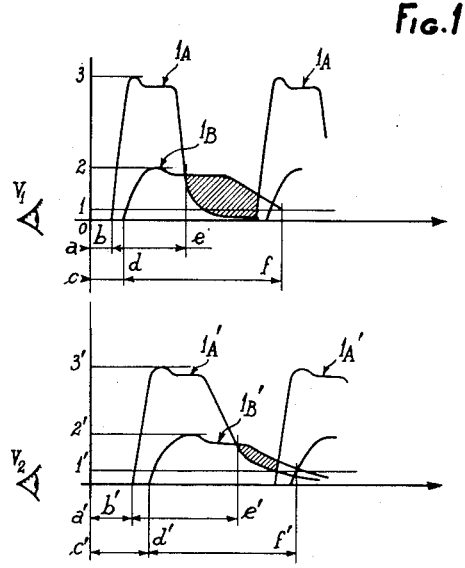
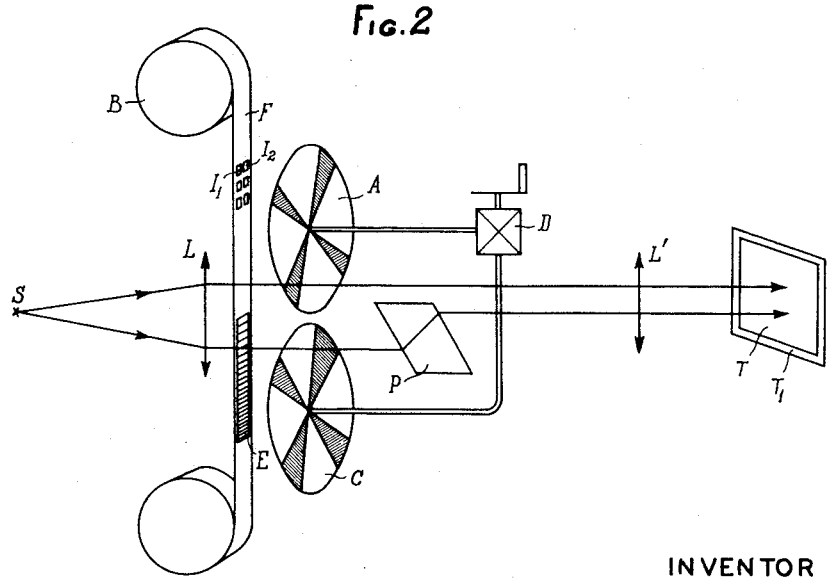
INVENTOR
ROGER LE RAY

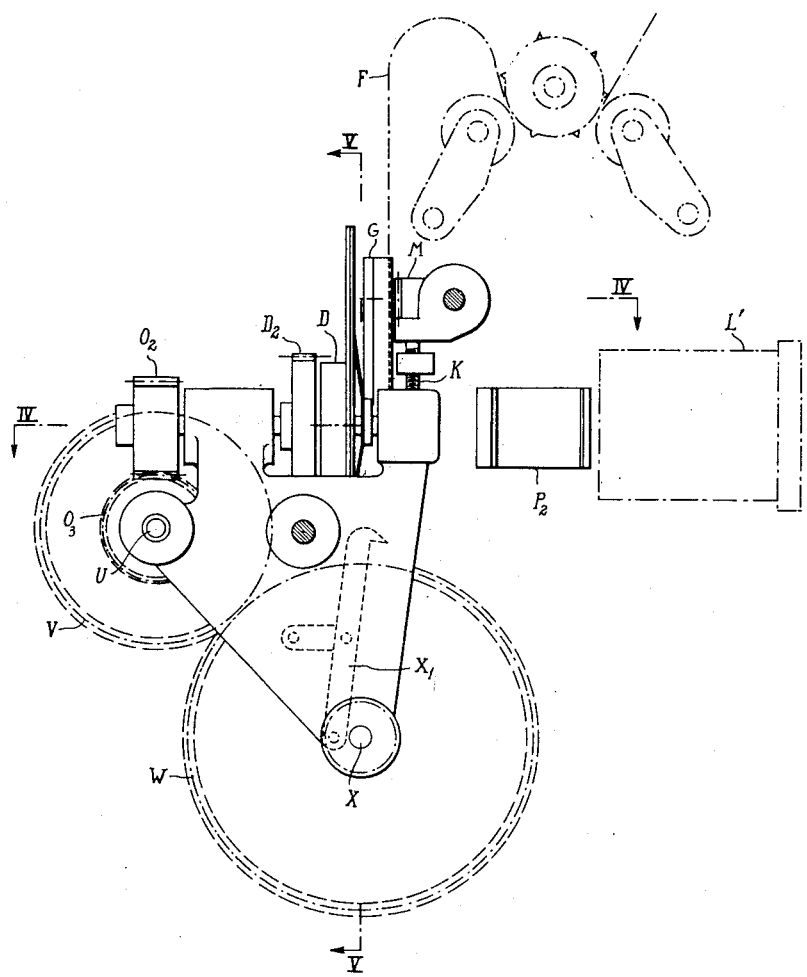

Aug. 22, 1961    R. LE RAY    2,996,949
THREE-DIMENSIONAL CINEMATOGRAPHY
Filed Dec. 14, 1953    4 Sheets-Sheet 4
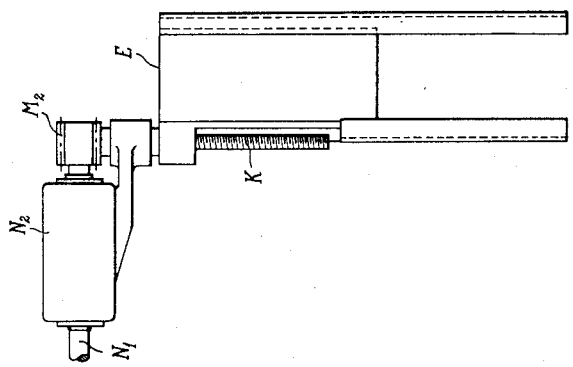
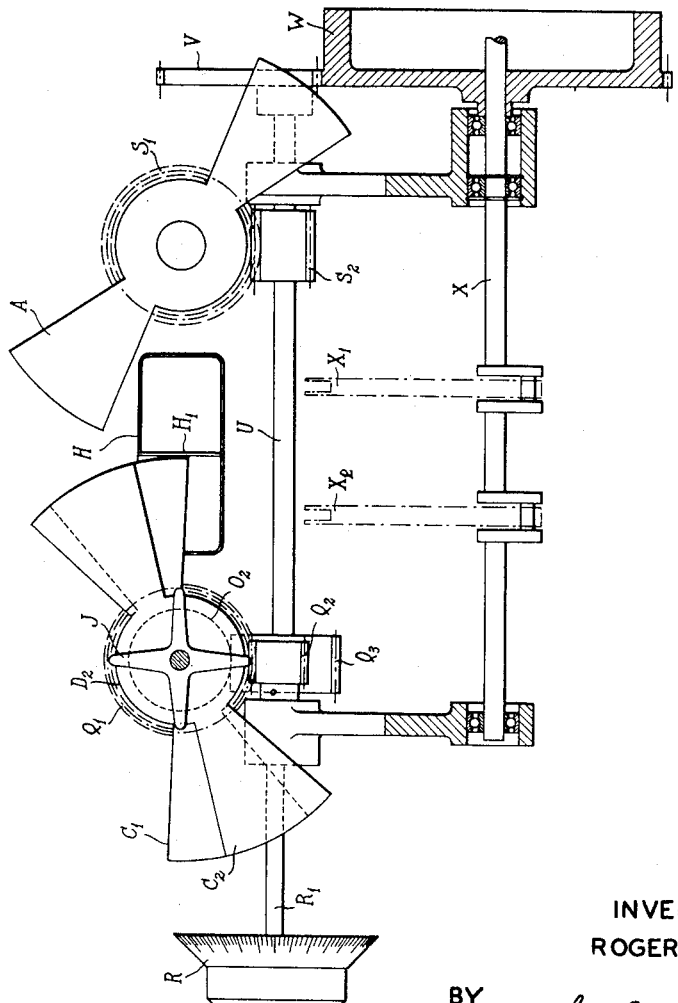
INVENTOR
ROGER LE RAY United States Patent Office 2,996,949
Patented Aug. 22, 1961

2,996,949
THREE-DIMENSIONAL CINEMATOGRAPHY
Roger Le Ray, Elba 32—305, Mexico City, Mexico
Filed Dec. 14, 1953, Ser. No. 398,145
Claims priority, application France Jan. 19, 1953
6 Claims. (Cl. 88—16.6)

This invention relates to three-dimensional or stereoscopic cinematography, and more particularly to improved projecting apparatus for use in stereoscopic cinematography.

It is an object of the invention to provide an improved method of three-dimensional cinematography which will not require the wearing of special spectacles or other selector expedients by the spectators.

Another object is to provide a method whereby a conventional stereoscopic film such as may be obtained by the use of known stereoscopic cameras may be successfully projected to provide an effective three-dimensional effect without requiring the wearing of spectacles by the spectators, or equivalent optical devices.

A further object is to provide a method of three-dimensional cinematography which is based on the physiological characteristics of perception in general, and visual perception in particular.

A further object is to provide a method of three-dimensional cinematography which takes advantage of the small, but ever-present, differences between sensitivity and related physiological characteristics of the left and right eyes of normal individuals in order to afford an effective three-dimensional impression when viewing a stereoscopic film without requiring the wearing of separator or selector devices, such as the special glasses which were heretofore necessary for the purpose.

Yet further objects relate to the provision of an improved three-dimensional projector apparatus, and particularly one that is relatively simple and conveniently adjustable during projection for carrying out the above specified methods.

My invention is based on the fact that with the great majority of human individuals, the left and right eyes have dissimilar characteristics of vision. A light stimulus of given intensity does not produce an equally intense visual impression or sensation on the left eye as it does on the right eye. It is also known that a difference in intensity between two visual sensations involves a corresponding difference between two further characteristic factors of visual perception, namely the time of latency of the visual sensation and the time of persistence thereof. Time of latency may be defined as the length of time elapsing from the instant a light stimulus strikes the eye to the instant the subject becomes aware of the stimulus as a corresponding visual sensation. Time of persistence may be described as the duration of a visual sensation caused by a stimulus of very short duration. Generally speaking, it is found that both the time of latency and the time of persistence decrease as the strength of the impression increases.

Thus, a common light stimulus applied substantially simultaneously to both eyes of an individual will induce in one eye a visual sensation which will rise to a greater height of intensity, and consequently will be initiated somewhat earlier and persist somewhat longer than the sensation induced in the other eye. A differential effect may thus be achieved which, according to my invention, provides a basis for selectively viewing the projected left and right eye images of a stereoscopic film while dispensing with the selector glasses which were heretofore necessary to achieve the requisite separation between the two projected images.

The particular eye that is dominant in the sense of having the shorter times of latency and persistence is not the same as from one individual to another. This, however, unexpected as it may appear, is found not to interfere with the effectiveness of the method disclosed herein, because experience shows that in the case of scenes or images of average complexity—such as those which normally go to make a motion-picture—the correct stereoscopic effect is not reversed even if the left-eye pictures of the stereoscopic film are viewed through the spectator's right eye and vice versa, this result being apparently due to a psychological interpretation effect that is automatically brought into play in such cases. In another connection, it is found that a satisfactory three-dimensional effect is attained even where one of the stereoscopic pair of images is viewed with considerably less brightness than the other image.

It is expressly noted, moreover, that the scope and practical utility of my invention are in no way limited by any theoretical explanations given herein, and the purpose of which is purely indicative and not binding.

In carrying the invention into practice, in brief, the brightness of one picture of each stereoscopic pair may be reduced as through an attenuator filter or the like, and the attenuated picture may then be projected in superimposed relation with the other, non attenuated picture, with the projection time of one picture preferably somewhat longer than that of the other picture, whereby the above-described selective action is enhanced.

An illustrative embodiment of a projector apparatus for carrying the invention into effect will be described hereinafter. In the accompanying drawings:

FIG. 1 is an explanatory diagram for illustrating the operating principle of the invention;

FIG. 2 is a diagrammatic representation of a projecting apparatus for carrying out the invention;

FIG. 3 is an elevational view of one practical form of construction of an improved projector;

FIG. 5 is a section on line V—V of FIG. 3; and

FIG. 6 is a partial front view as seen from the right of FIG. 4 and illustrating the filter adjusting mechanism.

Figure 4:
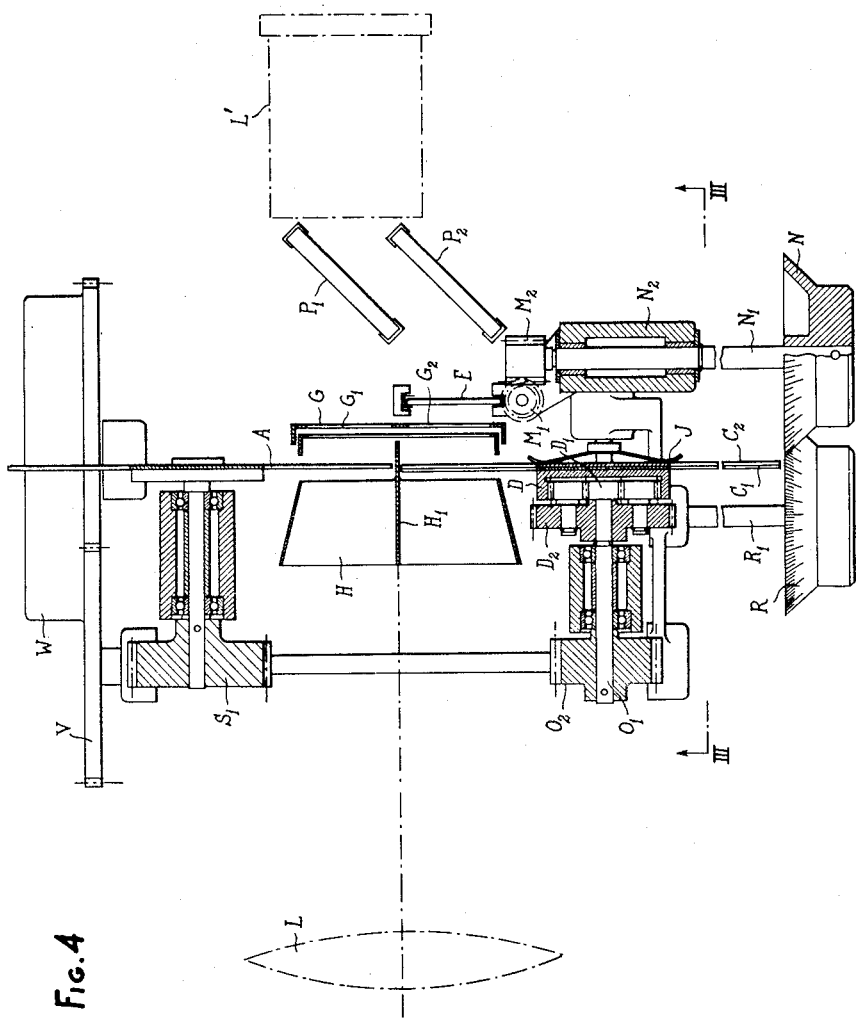
FIG. 4 is a section on line IV—IV of FIG. 3, drawn to an enlarged scale.

The charts of FIG. 1 depict some of the principles on which my invention is based. $V_1$ and $V_2$ represent the eyes of an observer, $V_1$ being the dominant eye, i.e. that which provides the stronger sensation in response to a given light stimulus. In each chart, the abscissa represents time, while the ordinate represents the strength of the visual response or sensation in arbitrary units. As will more clearly appear hereinafter, in carrying out the invention, the brightness of one picture, e.g. the left-eye picture, of each stereoscopic pair, is attenuated, and is then projected in super-imposed relation with the other, non-attenuated picture. In the upper chart, the curve 1A represents the response of an observer's dominant eye (e.g. the left eye) $V_1$ to the non-attenuated (e.g. right-eye) picture, and the curve 1B is the reponse of the same eye to the attenuated (e.g. left-eye) picture. Similarly, in the lower chart, curve 1A' depicts the response of the observer's right eye $V_2$ to the brighter (e.g. right-eye) picture, and curve 1B' shows the response of the same eye to the attenuated (e.g. left-eye) picture. It will be noted that in each chart, two crests are partially shown for each curve, thus corresponding to two successive frames of the film.

As measured along the ordinates, the distances O1 and O1' indicate the threshold of sensibility of the two eyes, as determined by the excitation by the attenuated images; these thresholds are substantially the same, as shown. The distances O2 and O2' indicate the maximum response of the respective eyes to the attenuated picture, while the distances O3 and O3' indicate the maximum responses to the brighter pictures. It will be noted that the maximum response is in each case shown somewhat greater for the dominant eye $V_1$ than it is for the other eye $V_2$.

As measured along the abscissae, $ab$ and $a'b'$ indicate the times of latency of the brighter picture in the eyes $V_1$ and $V_2$ respectively, and similarly $cd$ and $c'd'$ are the times of latency of the attenuated picture in the two eyes. In accordance with what was previously stated, the times $ab$ and $cd$ are respectively shorter than the times $a'b'$ and $c'd'$; moreover $ab$ is shorter than $cd$ and $a'b'$ is shorter than $c'd'$.

The distances $be$ and $b'e'$ indicate the times of persistence of the brighter picture in the eyes $V_1$ and $V_2$ respectively, and similarly $df$ and $d'f'$ indicate the times of persistence of the weaker picture in the two eyes. In accordance with previous statements, the times $be$ and $df$ are respectively shorter than the times $b'e'$ and $d'f'$; moreover $be$ is shorter than $df$ and $b'e'$ shorter than $d'f'$.

The relationships just indicated between the times of latency and the times of persistence for the respective pictures in the respective eyes are consequent upon the differential sensitivity of the eyes to each picture, as well as upon the different brightness of the two pictures striking each eye. It will be seen that the net result of the shapes and relative dispositions of the curves relating to both eyes, consequent on the above time relationships, is that the curve relating to the brighter picture overlaps the curve relating to the weaker picture to a greater extent in the eye $V_2$ than it does in the dominant eye $V_1$. The light energy striking each eye due to the weaker picture alone is substantially proportional to the cross-hatched areas shown in each related chart. It will be seen that this energy is substantially greater for the dominant eye $V_1$ than for the other eye. In other words, that picture of each stereoscopic pair which is passed through the attenuator filter will be viewed predominantly through the observer's dominant eye $V_1$, and only to a lesser extent through the other eye $V_2$.

The differential or selective effect thus achieved can be greatly enhanced by appropriately controlling one or more of the following parameters: (1) The degree of attenuation of the attenuated image, or in other words the degree of response to the attenuated image, O2 or $O'2'$; (2) The total time each image is exposed to view; and (3) The relative timing of the instants at which the two pictures are first exposed to view, or in other words the times $bd$ and $b'd'$. As already mentioned, the fact that one image of the stereoscopic pair is viewed with substantially less brightness than the other image, and the fact that the image which is predominantly viewed by the left eye may, with some of the spectators present, be actually the right-eye stereoscopic image, do not substantially detract from the effectiveness of the three dimensional impression received.

FIG. 2 illustrates in simplified diagrammatical form a projector apparatus according to the invention.

As diagrammatically shown in FIG. 2, the optical system of the device is schematically indicated by the lenses L, L', a light source is illustrated at S and a conventional screen at T. A film F has pairs of stereoscopic frames such as I1, I2 formed thereon and is fed past the optical system of the device by conventional mechanism of any suitable type, from a wind-off reel B to a wind-up reel B'.

A first revolving shutter A comprising a plurality of spaced masking sectors is mounted for rotation adjacent the film in such relationship relative to the picture frames thereon that the sectors of the shutter will intercept the path of the light beam from a first set of said frames (e.g. the set I1) towards the screen.

The beam traversing the other set of frames (I2) is deflected by suitable optical means such as the prism P. Arranged in the path of this second beam is an optical filter or screen E, preferably adjustable in position and opacity, and adapted to absorb part of the light energy of the beam traversing the second set of pictures. A second revolving shutter C generally similar to the shutter A is arranged to intercept the second light beam beyond the filter E. A differential mechanism D is preferably associated with the drive system of the shutters A and C for adjusting the relative setting of the discs and thereby adjusting the relative time displacement between the two pictures of each stereoscopic pair.

The brightness of the darker one of the two sets of pictures is adjusted by means of the filter E, while time of exposure of each set of pictures can be altered independently of the exposure time of the other set by varying the angular extent of the opaque sectors in the related shutter A or C.

Suitable drive mechanism, not shown, is provided for rotating the discs in synchronism with the film feed movement.

FIGS. 3 to 6 illustrate in greater detail a practical form of embodiment of the improved projecting device.

In these figures, elements forming part of conventional cinematographic projecting devices have been shown in chain lines, while elements more directly related to the present invention have been illustrated in full lines.

As shown, a conventional optical system may be used schematically indicated as comprising a condenser L and an objective lens L'. A film F having stereoscopic picture frames formed thereon is fed through a film track or channel G formed with twin apertures G1, G2 one for each set of pictures. A light channelizing device H comprises a channel provided with an intermediate partition H1 for preventing the light beam serving to illuminate the pictures of one set from illuminating the pictures of the other set.

A first rotatable shutter A is associated with the first set of pictures, being so mounted that the blades thereof rotate in the path of the light beam which has traversed one of the windows, e.g. G1, of the film track. A second shutter C is similarly associated with the second set of pictures. In the illustrative construction shown, each of the blades of disc C are comprised of a pair of sector plates C1, C2 mounted for angular adjustment relative to each other in order to adjust the time of exposure of the pictures of the second set. A resilient clamp member J serves to hold the sector plates C1, C2 in any adjusted relative position.

In the construction shown, a pair of planar mirrors $P_1$, $P_2$ serve to deflect the beam associated with the second set of pictures in order to displace said beam to a position such that it will be superimposed over the beam illuminating the first set of pictures. As shown, the mirror $P_1$ is a semi-transparent mirror having its normal axis set at an angle of 45° to the optical axis of the lens L'; the mirror $P_2$ is provided with a silver reflective surface, is arranged in a plane parallel to that mirror $P_1$ and is substantially centered with respect to the beam illuminating the second set of pictures. It will be apparent that the pair of mirrors $P_1$, $P_2$ may be replaced by any equivalent optical device, such as the prism P illustrated in FIG. 2.

Interposed on the path of the beam traversing the second set of pictures is an attenuating filter or screen E. Preferably, the screen E is formed with regions of variable opacity along its length, and is adjustable in position so as to bring any selected region of the filter into the path of the beam. Thus, as shown in FIG. 6, the mechanism for adjusting the filter may comprise a screw-rod K rotatable through a pair of helical gears $M_1$—$M_2$ by means of an adjusting knob N. The gear $M_2$ is fast on a shaft $N_1$ having the knob N secured on its opposite end and mounted for rotation in a bearing support $N_2$. Knob N is preferably provided with a vernier scale for accurately adjusting the position of the filter E and indexing the adjusted position. Thus, by rotating the knob N, the opacity of the filter area interposed in the path of the beam, and hence brightness of the attenuated set of images, may be adjusted during operation.

The film feed mechanism may comprise a pair of feeder fingers X1 and X2 (FIGS. 2 and 3) connected by crankpins to a crankshaft X in order to have a rocking movement imparted to said fingers on rotation of the crankshaft. The crankshaft X may be rotated by any suitable power means, such as an electric motor or the like. Secured on one end of the crankshaft is a flywheel W formed with an annular gearing thereon serving as a power take-off for driving the shutters A and C. For this purpose there is shown a gear V meshing with the gear teeth of wheel W and secured on a rotatable shaft U carrying a helical pinion S2 which meshes with a helical pinion S1 rotatable with the shutter A.

While shutter A is thus directly driven on rotation of the power shaft X, the other shutter C is driven through the medium of a differential for the purpose mentioned previously. Thus, shutter C has coaxially secured to the hub thereof an internal gear annulus D which, through planetary pinions rotatably mounted on a planetary carrier disc D2, is driven from the sun-gear D1 of the differential. The sun-gear D1 is secured on a shaft O1 journalled in suitable bearings for rotation coaxially with the shutter C. The shaft O1 further carries a helical gear O2 meshing with a gear O3 secured on the shaft U. The planetary carrier disc D2 has gear teeth formed on its periphery to mesh with a helical gear Q2 secured on a shaft R1 having an adjusting knob R secured on its outer end, preferably provided with a vernier scale thereon. A suitable value for the gear ratio of the differential described is 1:3.

With drive shaft X driven at a suitable speed from its power source, the fingers X1, X2 are rocked and impart an intermittent feed motion to the film in a manner well-known to the art.

At the same time, shutter A is rotated in synchronism with the film feed motion through the gear train W—V, shaft U and gearing S1—S2. Moreover, planetary-carrier D2 being prevented from rotating owning to its meshing engagement with the helical gear or screw Q2, the drive is transmitted from shaft U, through gearing O3—O2 to shaft O1 and thence through sungear D1, the planetary pinions and annulus D to the shutter C. The shutter C is thus rotated in synchronism with shutter A. By rotating knob R to rotate the planetary-carrier D2 through gearing Q2—Q1, it is possible during operation of the system to alter the relative setting between the shutters A and C in order to adjust the relative timing at which the pictures in the two sets are exposed on the screen.

Thus it will be seen that the projection device disclosed accomplishes the various functions required according to the teachings of the invention for providing a vivid three-dimensional impression upon the projection screen. Prior to commencing the projection, an initial adjustment may be made involving an adjustment of the relative setting of the shutters C1 and C2 in order to adjust the time of exposure of the attenuated set of pictures. Then, during projection, a fine adjustment may be made by acting on the knob N for adjusting the attenuation and on the knob R for controlling the relative time-displacement between the appearance of the two sets of pictures on the screen.

It has been found advantageous, when projecting a three-dimensional cinematographical film according to the method of the invention, to operate in an incompletely darkened room or a slightly illuminated room, since this increases the sensitivity threshold of perception; preferably, a screen T having a black or dark peripheral border is then used, as shown in FIG. 2.

A cinematographical film adapted for three dimensional projection by the method described may be obtained by means of a conventional camera with a stereoscopic lens. While in the above description the picture frames in each stereoscopic pair were shown as being spaced transversely of the length of film, it will be apparent that the device may readily be modified for use with films in which the pictures in each pair are spaced longitudinally of the film. Likewise, the invention would be applicable to an arrangement wherein the pictures of the two sets are located on separate films. In this connection, the pictures of the two sets may be taken with equal times of exposure or with different exposures. The pictures in the two sets are preferably taken with a relative angular displacement greater than that corresponding to the normal binocular spacing.

It will be understood that while only one practical embodiment of the invention has been described in detail hereinabove and illustrated in the accompanying drawings, many modifications may be made in the exemplary construction shown, and other equivalent constructions may be devised by those familiar with the art within the scope of the ensuing claims.

What I claim is:

1. A projecting device for three-dimensional cinematography which comprises an optical system, means for intermittently feeding a film having pairs of stereoscopically-related pictures formed thereon past said system, means in said system for successively projecting an optical image of one picture of each successive pair on a screen, means in said system for deriving from the other picture of each successive pair an optical image of attenuated brightness and for successively projecting said attenuated image on said screen in superimposed relation with said first images, first and second shutter means operable in synchronism with said intermittent feed means for intermittently cutting off said first and said second images, means associated with at least one of said shutter means for varying the cut-off period of one of said images, and means associated with said shutter means for varying the relative time-displacement between the cut-off periods for the two images.

2. A projecting device as claimed in claim 1, wherein said first shutter means comprises a first rotatable shutter and said second shutter means comprises a second rotatable shutter, means for rotating said shutters in synchronism with said feed means, and means for adjusting the relative setting of said shutters.

3. A projecting device as claimed in claim 1, wherein said first shutter means comprises a first rotatable shutter and said second shutter means comprises a second rotatable shutter, means for rotating said shutters in synchronism with said feed means, and differential means for adjusting the relative setting of said shutters during rotation thereof.

4. A projecting device for three-dimensional cinematography which comprises an optical system, means for intermittently feeding a film having pairs of stereoscopically-related pictures formed thereon past said system, means in said system for successively projecting an optical image of one picture of each successive pair on a screen, a filter in said system for deriving from the other picture of each successive pair an optical image of attenuated brightness said filter including areas of different opacity thereon, and means for successively projecting the attenuated image on said screen in superimposition with said first image, first and second rotatable shutters adapted to cut off said first and second images respectively, means for rotating said shutters in synchronism with said feed means, means for adjusting the angular extent of at least one of said shutters, differential means for adjusting the relative setting of said shutters during rotation thereof, and means for displacing said filter for presenting a selected area thereof in the path of said second image.

5. In a method of three-dimensional cinematography, the steps of forming two stereoscopically-related sets of pictures, optically deriving two sets of images therefrom, reducing the brightness of one set of images relative to the other, projecting the two sets of images in superimposed relation, time-shifting the projection of one image relatively to the other image of any pair of corresponding images in said sets, and reducing the duration of projection of any image of one set, the brightness of which has been reduced, with respect to the duration of projection of the corresponding image in the other set.

6. A projecting device for three-dimensional cinematography which comprises an optical system, means for intermittently feeding a film having pairs of stereoscopically-related pictures formed thereon past said system, means in said system for successively projecting an optical image of one picture of each successive pair onto a screen, means in said system for deriving from the other picture of each successive pair an optical image of attentuated brightness and for successively projecting said attentuated image onto said screen in superimposed relation with said first image, shutter means operable in synchronism with said intermittent film feed means, said shutter means comprising a first rotatable shutter for cutting off said first images and a second rotatable shutter for cutting off said second images, and means for adjusting the angular extent of at least one of said shutters.

References Cited in the file of this patent

UNITED STATES PATENTS

| | | |
|---|---|---|
| 1,435,520 | Hammond | Nov. 14, 1922 |
| 1,556,566 | Wright | Oct. 6, 1925 |
| 1,714,849 | Daponte | May 28, 1929 |
| 1,970,212 | York | Aug. 14, 1934 |
| 2,166,947 | Fayerweather | July 25, 1939 |
| 2,711,668 | Dresser | June 28, 1955 |

FOREIGN PATENTS

| | | |
|---|---|---|
| 344,289 | France | Aug. 31, 1904 |
| 247,240 | Great Britain | Feb. 12, 1926 |
| 909,001 | France | Nov. 12, 1945 |
| 976,049 | France | Oct. 25, 1950 |